(No Model.)

L. P. MOORE.
HORSE DETACHER.

No. 596,078. Patented Dec. 28, 1897.

Witnesses
E. C. Wurdeman
J. S. Williamson

Inventor
Louis P. Moore
by Geo. H. Holgate
Attorney

United States Patent Office.

LOUIS P. MOORE, OF STATESVILLE, NORTH CAROLINA.

HORSE-DETACHER.

SPECIFICATION forming part of Letters Patent No. 596,078, dated December 28, 1897.

Application filed August 31, 1897. Serial No. 650,077. (No model.)

*To all whom it may concern:*

Be it known that I, LOUIS P. MOORE, a citizen of the United States, residing at Statesville, in the county of Iredell and State of North Carolina, have invented a certain new and useful Improvement in Horse-Detachers, of which the following is a specification.

My invention relates to a new and useful improvement in horse-detachers for vehicles, and has for its object to provide such a device by means of which a horse may be quickly and easily released from the shafts in case of accident or runaway; and another object of this invention is to provide a brake mechanism for checking the movement of the vehicle after the horse is released; and a still further object of the invention is to utilize the brake mechanism for supporting the shafts after the horse is passed therefrom in order to prevent the ends of said shafts from coming in contact with the ground and thereby being broken.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
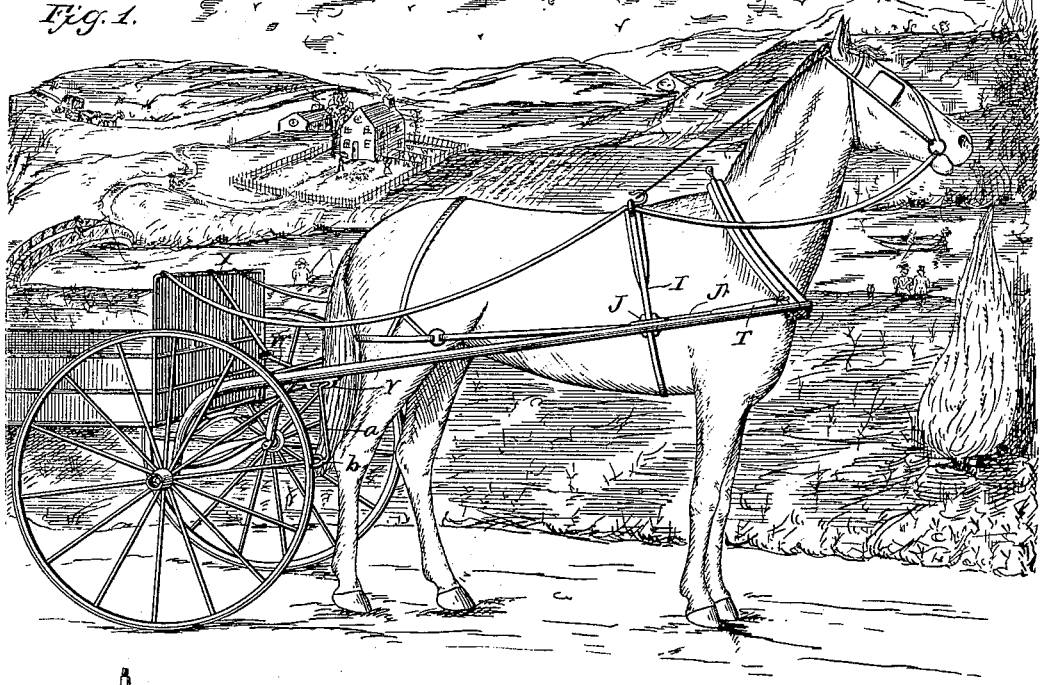
Figure 2:
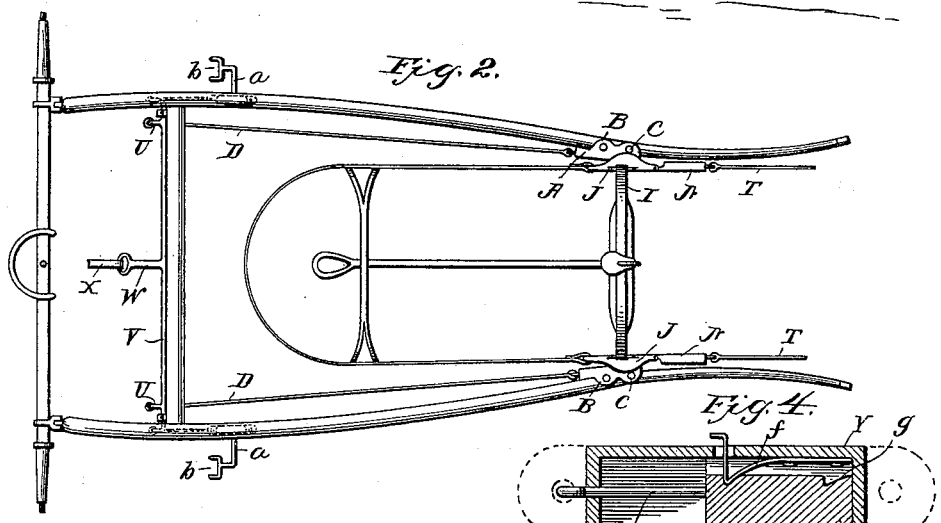
Figure 4:
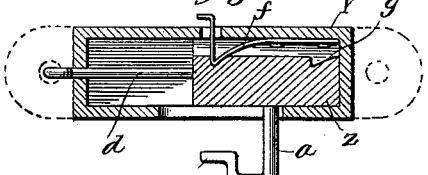
Figure 3:
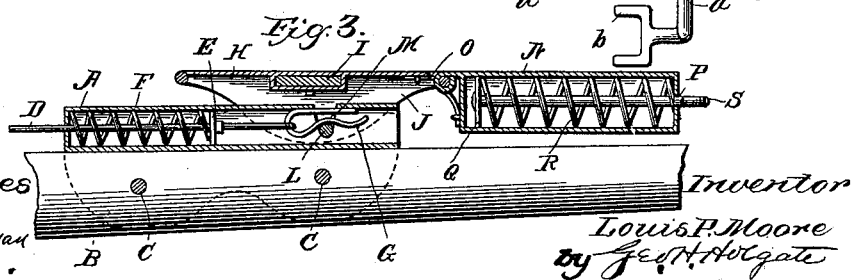

Figure 1 is a perspective showing the application of my improvement to a vehicle; Fig. 2, a plan view of the shafts and harness attached thereto; Fig. 3, a horizontal sectional view of the releasing mechanism, showing its attachment to a shaft; and Fig. 4, a section of the brake mechanism.

In carrying out my invention as here embodied, A represents a casing provided with the ears B, by means of which it is attached to the shaft, the pins or rivets C being utilized for that purpose, and it being of course understood that there are two of these casings, one upon each shaft, as clearly shown in Fig. 2. A rod D passes into each of the casings and has secured thereon a collar E, between which and the end of the casing is interposed a coil-spring F, so as to give the rod an inward tendency, and the inner end of this rod has attached thereto the spring-clip G for the purpose hereinafter set forth.

A back-band buckle H is attached in the usual manner to the back-band I, and this buckle is provided with the flanges J, in which is secured the bar L, said bar being adapted to pass within the slot M, formed in the casing A, and when placed within this slot may be there held by the spring-clip G, passing behind the bar, and this clip will be prevented from accidental withdrawal both by its peculiar shape and the forward tendency given to said clip by the spring F. From this arrangement it will be seen that to hitch a horse to the shafts after he has been placed therebetween it is only necessary to retract the clips G, insert the rods M within the slots, and release the clips, when they will move forward and into engagement with the bars, thus securely holding the same, as before set forth, and hitching the horse without further manipulation.

Hinged to the forward end of each of the casings A is a casing N, and in practice I prefer that a suitable spring, such as that indicated at O, be so arranged at this joint as to normally turn the casing end outward toward the shaft so as to prevent the chafing of the horse thereby, as will be readily understood.

A rod P is fitted to slide within the casing N and carries a collar Q, between which and the outer end of the casing is interposed a coil-spring R, thus normally holding the rod in a retracted position within the casing, and the outer end of this rod is provided with a loop or eye S, to which the trace T may be secured, which latter is attached to the hame in the usual manner. This arrangement will permit the go and come of the traces to accommodate the movements of the horse without the use of a whiffletree, and when the horse is holding back, so that the traces are slackened, the casings N will swing outward, as before described.

The rods D extend rearward from the casings A and are attached to the arms U, which project downward from the cross-rod V, the latter being journaled upon the cross-bar of the shafts in any suitable manner. Now this cross-rod also has projecting therefrom the arm W, to which may be attached any suitable strap X, the latter being passed forward over the dashboard, so that by drawing upon this strap the cross-rod will be turned upon its axis, during which movement the arms U will draw the rods D backward against the action of the springs F and in so doing draw the spring-clips G from engagement with the bars L, thereby loosening the buckles H and freeing the horse from the shafts, so that he may pass therefrom without affecting the vehicle.

In releasing the horse from the vehicle it is essential that the ends of the shafts should be held sufficiently elevated to prevent them from coming into contact with the ground, which might result in serious accidents, and this result, as well as the retarding of the forward movement of the vehicle, I accomplish by a brake mechanism, which is of the following construction:

A housing Y is secured to each of the shafts, near the rear thereof and beneath the same, as clearly shown in Fig. 1, and in each of these housings is fitted a block Z, so as to slide lengthwise thereof, and this block has attached thereto the brake-rods $a$, which terminate in shoes $b$, said shoes being preferably forked and normally lying in close proximity to the rims of the wheels, at or above the horizontal diameter thereof. The blocks Z are attached to the cross-rod V by means of the connecting-rods $d$, the rear ends of which are attached to the cranked ends of said cross-rod, as shown in dotted lines in Fig. 2, by which arrangement the turning of the cross-rod upon its axis, as above described, will draw the blocks Z rearward, and in so doing will bring the brake-shafts into contact with the rims of the wheels, thereby applying friction to said wheels and at the same time operating the shafts, since these brakes when in contact with the wheel will tend to describe a circle the center of which is eccentric with the center of the wheels, thereby increasing the bite of the brakes upon the wheels during the revolving of the latter; but in order to avoid the necessity of the driver having to retain his hold upon the strap X for a continued application of the brakes I provide a spring-latch $f$, which is secured within the housing Y, so that when the brake-block is drawn rearward sufficiently to cause the notch $g$ to register with the nose of said latch the latter will spring within this notch and hold the block in this position until the vehicle has been stopped and the latch released. From this description it will be seen that should a horse become unruly and the occupant of the vehicle be endangered it would only be necessary to draw upon the strap X to free the horse from the shafts and at the same time apply the brakes to the front wheels of the vehicle, the force of which application would be increased by the horse passing from the shafts and permitting the weight of the latter to be exerted upon the brakes to bring about the stopping of the vehicle.

Of course I do not wish to limit myself to the exact details of construction here shown, as these may be varied considerably without departing from the spirit of my invention, the gist of which rests in the broad idea of providing means for attaching a horse to the shafts in such a manner that he may be released instantaneously, and also by the same movement an effective brake-power be applied to the wheels of the vehicle, which will likewise support the outer ends of the shafts, and it is of course obvious that instead of using a strap X the cross-rod may be actuated by any suitable means arranged within the vehicle, where easy access may be had thereto either by the hand or foot.

Having thus fully described my invention, what I claim as new and useful is—

1. In combination with a detaching device, two housings, one attached to each shaft, a block fitted within each of the housings, a brake-rod carried by the block, a shoe formed upon the end of the rod, means for drawing the block rearward so as to bring the shoe into contact with the wheel-rim, and means for holding said block in its rearward position, as specified.

2. The herein-described combination of the casings A attached to the shafts of a vehicle, spring-clips arranged within said casings, rods connected thereto, coil-springs for holding the rods in their normal positions, buckles carried by the harness, bars carried by said buckles adapted to enter into engagement with the casings and be there held by the clips, a cross-rod having arms U to which the first-named rods are attached, a means for revolving said cross-rod upon its axis, housings attached to the shafts, blocks fitted to slide therein, means for connecting said blocks to the cross-rod, brake-rods carried by the blocks, shoes formed upon the ends of the brake-rods, casings N hinged to the buckles, means for swinging said casings outward, and spring-actuated draw-rods fitted within the casings N, substantially as and for the purpose set forth.

3. In combination, a housing secured on each shaft, a block slidably fitted in each housing, rods depending from said blocks, brake-shoes on the lower ends of the rods, a spring-latch secured in each housing to engage notches in the block, connecting-rods extending rearwardly from the blocks and a cross-rod connecting said rods, as and for the purpose described.

In testimony whereof I have hereunto affixed my signature in the presence of two subscribing witnesses.

LOUIS P. MOORE.

Witnesses:
PAUL CHATHAM,
H. G. CHATHAM.